ously, the lower the absolute value of the biasing voltage, the more of these like-charged particles will get through to the probe. Thus, by measuring, for example, the electron current to the probe (net number of negatively-charged electrons) at a series of different negative voltages, it is possible to determine the distribution of kinetic energy among the electrons being collected; that is, fraction of these electrons which have any given value of kinetic energy. Since this permits the determination of the average kinetic energy of all the electrons, and

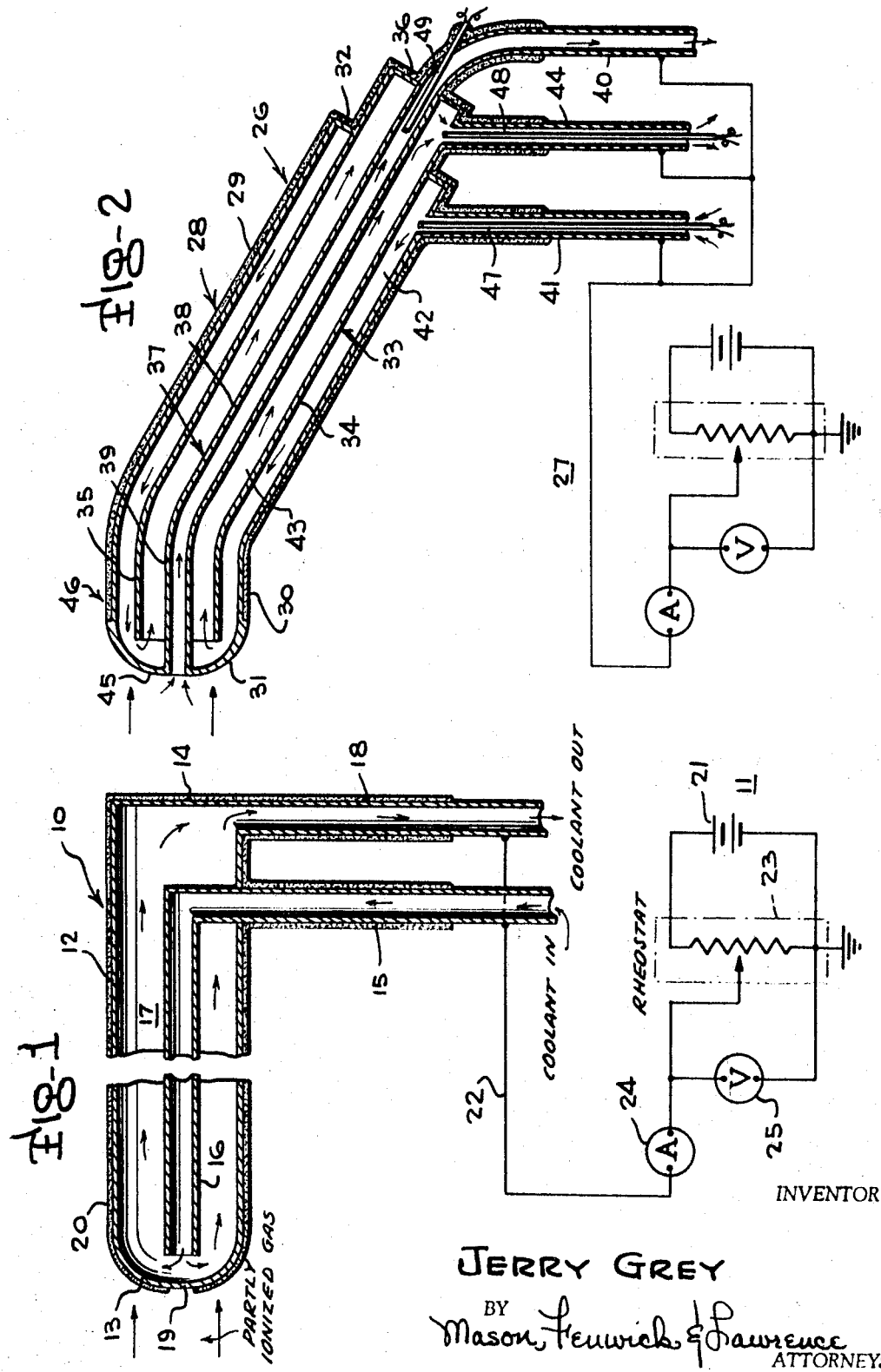

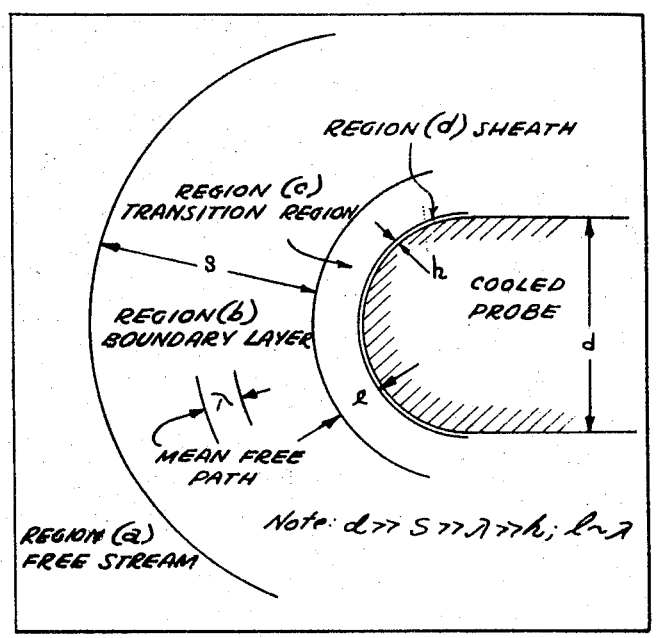
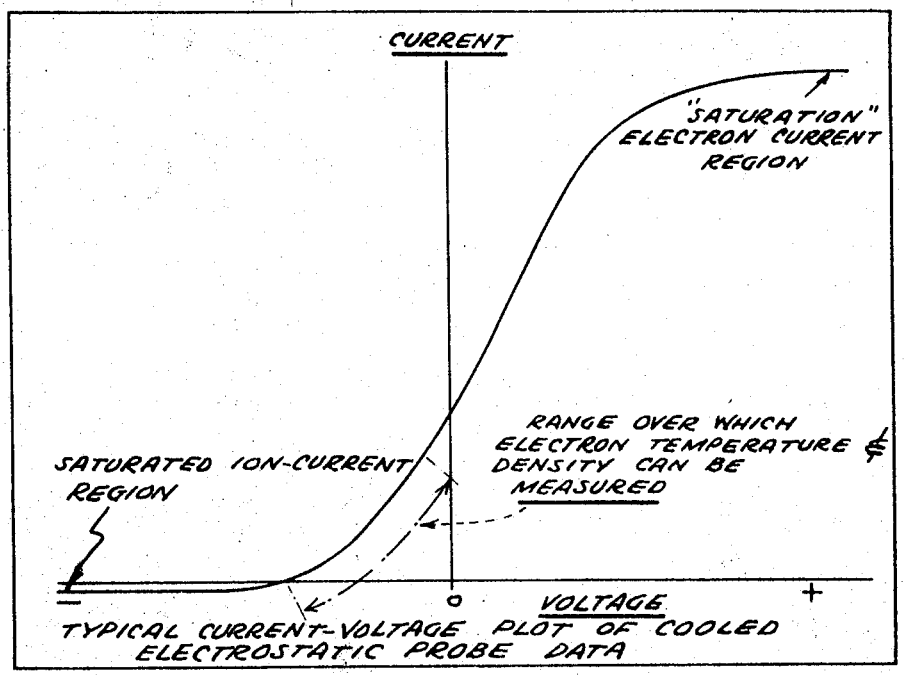

United States Patent Office 3,459,039
Patented Aug. 5, 1969

3,459,039
METHOD AND DEVICE FOR DETERMINING PROPERTIES OF AN IONIZED GAS
Jerry Grey, 61 Adams Drive, Princeton, N.J. 08540
Filed June 23, 1966, Ser. No. 559,850
Int. Cl. G01k 17/00
U.S. Cl. 73—190
22 Claims

ABSTRACT OF THE DISCLOSURE

A probe for diagnosing properties of a partly or fully ionized gas generally including electrically conducting means insertable in an ionized gaseous environment, means for cooling the electrically conductive means and means for electrically insulating the electrically conductive means from the ionized gaseous environment with the exception of a selected area thereof.

---

This invention relates to a method and device for determining the properties of a partly or fully ionized gas or plasma, and more particularly to a device for determining the electron temperature and density of a partly or fully ionized gas. This invention further contemplates a novel probe utilized in such device capable of continuous immersion in environments such as arcjets, rocket motor interiors and nozzles or hyperthermal wind tunnels.

The technique of using an electrostatic probe to determine electron concentration, ion concentration and electron temperature in a partly or fully ionized gas (plasma) has been suggested in the prior art. However, it also has been theorized that an electrostatic probe can be utilized in making such determinations only when the probe diameter is much smaller than the mean free path of the gas to be measured, wherein the mean free path of the gas is defined as the average distance traveled by a gas particle, including an atom, molecule or ion, between collisions with another particle. Because partly or fully ionized gases generally must be at high temperatures in order to keep the electrons and ions from recombining into an ordinary neutral gas, a corollary to the aforementioned axiom is that the gas density must be so low, i.e., have a large mean free path, that the heat transfer to the probe will be sufficiently small as to not cause it to burn up when immersed in the gas. In view of the limitations suggested by the aforementioned, it has been found desirable to provide an effective method and device for determining properties of partly or fully ionized gases unobtainable from conventional methods and devices.

Accordingly, it is the principal object of this invention to provide a novel method and device for determining various properties of a partly or fully ionized gas.

Another object of this invention is to provide a novel method and device for determining various properties of a high temperature, partly or fully ionized gas having a comparatively small mean free path.

A further object of this invention is to provide a novel method and device for determining electron temperature and concentration of a partly or fully ionized gas.

A still further object of this invention is to provide a novel method and device for determining electron temperature and concentration, in addition to other properties including floating potential, saturation current ratio in dense plasmas, enthalpy, degree of nonequilibrium in a reduced pressure plasma (argon), a semi-quantitative measurement of plasma turbulence, heavy particle temperature, velocity and chemical composition of a partly or fully ionized gas.

Another object of this invention is to provide a novel method and device for determining various properties of a partly or fully ionized gas including a novel electrostatic probe.

A further object of this invention is to provide a novel method and device for determining various properties of a very high temperature, partly or fully ionized gas, including electron temperature and concentration, having a novel electrostatic probe adapted to be immersed in the gas without melting or burning.

A still further object of this invention is to provide a novel method and device for determining various properties of a high temperature, partly or fully ionized gas stream in an environment such as an arcjet, a rocket motor interior and nozzle, or a hyperthermal wind tunnel, including a novel electrostatic probe adapted to be immersed in such environment without melting or burning.

Another object of this invention is to provide a novel electrostatic probe adapted to be used in a device for determining various properties of a partly of fully ionized gas.

A further object of this invention is to provide a novel electrostatic probe adapted to be used in a very high temperature, partly or fully ionized gas without melting or burning, which further is adapted to be used in a device for determining various properties of the gas including electron temperature and concentration.

A still further object of this invention is to provide a novel electrostatic probe adapted to be immersed in a very high temperature, partly or fully ionized gas stream in an environment such as an arcjet, a rocket motor interior and nozzle, or a hypothermal wind tunnel without melting, which further is adapted to be used in a device for determining various properties of the gas including electron temperature and concentration.

Other objects and advantages of the invention will become more apparent to those persons skilled in the art, from the following, taken in conjunction with the accompanying drawings, wherein:

FIGURE 1 is a sectional view of an embodiment of the invention, having a portion thereof broken away and a portion thereof illustrated schematically;

FIGURE 2 is a sectional view of a second embodiment of the invention, having a portion thereof illustrated schematically;

FIGURE 3 is a schematic view of the various regions of a gaseous environment, adjacent a probe utilized in the invention; and FIGURE 4 is a typical current-voltage plot of data developed by the invention which can be utilized to mathematically compute electron temperature and density.

The basic principle of any electrostatic diagnostic probe is simply that if an electric conductor is placed in a gas which contains both electrons (negative) and ions (positive), it can be biased by a positive or negative voltage so as to collect particles of opposite electric charge, simultaneously repelling particles of like electric charge. Since, however, the particles in a gas have, in general, a distribution of random velocity (kinetic energy), some particles of the same charge as the biasing (probe) voltage may have enough kinetic energy to overcome the repulsive electric force and still strike the probe. Obviously, the lower the absolute value of the biasing voltage, the more of these like-charged particles will get through to the probe. Thus, by measuring, for example, the electron current to the probe (net number of negatively-charged electrons) at a series of different negative voltages, it is possible to determine the distribution of kinetic energy among the electrons being collected; that is, fraction of these electrons which have any given value of kinetic energy. Since this permits the determination of the average kinetic energy of all the electrons, and since this average kinetic energy is indeed, defined as the "temperature" of the electrons, then the probe can measure the "electron temperature." Also, by applying a very high positive voltage, all the electrons in the probe neighborhood will be collected, and thus, by measuring this "saturation" current of electrons, the electron concentration (number per unit volume) in the probe's neighborhood can be calculated. The same statements can, of course, be made regarding the positive ions.

It is clear from the above that in order for the probe to be useful, it should not alter, by its own presence, either the concentrations of electrons or ions or their distributions of kinetic energy (temperature), since the probe will then measure the altered characteristics rather than so-called "undisturbed" values. This accounts for the conventional assumption to the effect that the mean free path (average distance between gas-particle collisions) must be large compared to the probe diameter, for if such were the case, then there would exist no mechanism by which the probe could "disturb" the gas to be measured, such disturbances resulting only from collisions between the gas particles in the probe neighborhood.

At one atmosphere pressure typical mean free paths $\lambda$ are only of the order of 0.0001 to 0.00001 centimeter, even at very high temperatures. This means that in order to utilize a classical probe of reasonable dimensions, say 0.1 cm. diameter $(d)$, it is necessary that, for $\lambda$ to be of the order of, say $10d$, the pressure be at most $10^{-4}$ to $10^{-5}$ atmospheres. Thus the classical electrostatic (of the type developed by Dr. Irving Langmuir) probe is limited to very low-pressure measurements, and electrostatic probes have not previously been used for measurements in gases at pressures of the order of one atmosphere (electron densities above $10^{14}$ per cubic centimeter).

It has in recent years become of considerable interest to measure the properties of comparatively dense, partly-ionized gases; e.g., at temperatures of 10,000 to 30,000° F. and at pressures around one atmosphere. Because of the obvious limitations on the classical Langmuir probe, as discussed above, no successful attempts have ever been made to utilize electrostatic probes for this range of conditions, since mean free paths of the order of $10^{-4}$ or $10^{-5}$ cm. are involved. However, it has been found possible to utilize a probe with diameter much larger than a mean free path which is capable of collecting data leading to electron temperature and electron concentration determinations (and also other characteristics such as local electric fields, etc.) but which gives inadequate data regarding the positive ions. Since a knowledge of these electron properties is often of great importance to fundamental physical phenomena, even without the ion data, the capability for measuring them is of great significance to the field of plasma diagnostics. Further, in combination with the device and method described in Patent No. 3,167,956 issued Feb. 2, 1965, which is itself capable of measuring ion temperatures, the embodiments of the present invention hereinafter described provide the capability for complete plasma diagnostic data at these high densities.

The basis on which the probes utilized in the present invention operate is illustrated by the diagram of FIGURE 3. In this diagram, the gas in the neighborhood of a relatively large probe $(d \gg \lambda)$ may be considered to be divided into four regions:

(a) The undisturbed (free-stream) gas far from the probe, which is the region whose characteristics are to be measured.

(b) A region of gas which is affected by the probe's presence, but into which there penetrate no electric-field effects of the probe; i.e., an ordinary "boundary layer," such as is encountered in conventional aerodynamics, dominated solely by gas-particle collisions.

(c) A region of gas in which the energy which can be given to a charged gas particle by the probe's electric field is at least of the same order as the particle's kinetic energy (temperature). This is called the "transition region," and indicates that region in which both gas particle collisions and electric field forces can be important.

(d) A region of gas in which the electrostatic field is the dominating influence on gas particle movement. This is known as the "sheath."

It is ideally desired that electrons in region (a), the undisturbed gas, reach the probe surface both undiminished in number and unchanged in temperature, in order that the appropriate undisturbed values of electron concentration and electron energy (temperature) be measured. Thus it is necessary that the electrons pass through regions (b), (c), and (d) of FIGURE 1, without either recombining with an ion or having their average kinetic energy (temperature) changed by collisions with particles in the boundary layer.

The problem further is complicated by the fact that in these dense, high-temperature plasmas, the heat transfer to the probe is so high that supplementary cooling is necessary in order to keep the immersed probe from melting or even burning up. This cooling effect is now transmitted by collisions to the gas surrounding the probe, extending to the outer boundary of region (b), the boundary layer, and thus the gas to be measured in region (a) is separated from the probe by a cooler gas region; i.e., a gas region whose particles have lower kinetic energy. Thus, if an electron in the free stream (region (a)) is to reach the probe, it will be cooled (i.e., have its kinetic energy reduced) by collisions with the cool particles in the boundary layer. However, it can be shown that the energy loss per collision of an electron with a cold heavy particle (ion or atom) is so small that even after the hundreds of collisions an electron must make by the time it has traveled from the free-stream, (region (a)) to the probe surface, it has lost only a tiny percentage of its initial kinetic energy, and therefore, reaches the probe with nearly the same energy as it started with.

It is quite reasonable that the electron can undergo several hundred, or even several thousand, collisions with heavy particles in the boundary layer, and still not have lost more than a few percent of its initial kinetic energy (temperature).

It further can be shown that the electrons, which still have their high random velocities as discussed above, spend on the average, insufficient time in the boundary layer to recombine, and thus only a tiny fraction of them, if any, will recombine with ions before reaching the probe. However, because the heavy particles (atoms and ions) are cooled by the probe as in ordinary boundary layers, their density near the probe will be greater than that in the free stream. It can be shown, however, that this increase in heavy-particle density is almost exactly compensated for by the decrease in electron/heavy-particle concentration necessary to maintain the diffusive flow of electrons toward the probe, so that the actual electron density, which is the product of these two effects, is virtually constant across the boundary layer.

It also can be shown that the total thickness of the sheath and transition regions (regions (c) and (d) in FIGURE 3) is less than one mean free path of the electrons, and is also several orders of magnitude smaller than the boundary layer thickness; i.e., referring to FIGURE 3:

$$h \ll l \ll \delta$$
$$\lambda \approx l$$

Thus, any electron which reaches the inner edge of the boundary layer can reach the probe, if its kinetic energy is still greater than the opposing probe voltage, because it will probably undergo no further collisions in the sheath or transition regions (regions (c) and (d)).

In summary, if a cooled probe is immersed in a partly ionized gas of sufficient density that its mean free path is much smaller than the probe diameter, then:

(a) The free-stream electrons will reach the probe with nearly their original temperature, despite having experienced hundreds of electron-atom or electron-ion collisions in the boundary layer. Thus, their initial temperature may be determined in exactly the same way as is done with classical Langmuir probes, as discussed above.

(b) Practically all of the free-stream electrons will reach the probe, only a tiny fraction, if any, recombining with the ions in the boundary layer. Thus, the current of electrons may be used to determine the free-stream electron concentration exactly as is done for classical Langmuir probes, as discussed in detail later.

(c) The saturation current of ions (at high negative probe voltages) will be much lower in the cooled probe than in the classical Langmuir probe, due to the cooling effect mentioned above. In fact, it is shown that if the degree of ionization is not too large, $$\frac{(j_e)_{sat}}{(j_i)_{sat}} = \sqrt{\frac{m_i(T_e)_\infty}{m_e(T_A)_w}}$$

where $(j_e)_{sat}$=saturation electron current density (at high positive probe voltage)
$(j_i)_{sat}$=saturation ion current density (at high negative probe voltage)
$T_e$=electron temperature
$T_A$=heavy-particle temperature
( )$_\infty$ refers to free stream (region (a) in FIGURE 3)
( )$_w$ refers to probe surface Quantitatively, it may be stated that the criterion for obtaining ion data (concentration and temperature) from an electrostatic probe is $$\frac{d}{\lambda} \ll 1$$

whereas, the criterion for obtaining the same data for electrons is $$\beta \equiv 2\sqrt{6}\frac{m_e}{m_i}\frac{\delta}{\lambda} \ll 1$$

where $d$=probe diameter (or other typical probe dimension)
$\lambda$=mean free path (average distance between collisions) in the free-stream gas
$m_e$=mass of electron
$m_i$=mass of ion
$\delta$=thickness of boundary layer (see FIGURE 1)

For a typical "dense" plasma (argon gas at 1 atm. pressure and 30,000° F.), $$\frac{d}{\lambda} \approx 1000$$

$$\beta \approx \frac{1}{200}$$

and thus a cooled probe will be useless for collecting ion data, but can be used for a reasonably accurate measurement of electron densities and electron temperatures.

Referring to FIGURE 1 of the drawings, there is illustrated a first embodiment of the invention generally including a cooled electrostatic probe 10 and an electrical measuring circuit 11. The probe 10 consists of a tubular member 12 having a curved closed tip portion 13 and a closed rear end wall 14. The tubular member 12 is of extremely small size, as small as 0.010 inch in outside diameter, and is formed of an electrically conducting material. The typical diameter of the member 12 may vary in the range of 0.010 inch to 0.250 inch. Coolant under pressure is introduced into the interior of the probe by means of an inlet conduit 15 secured on the rearward end of the tubular member, which communicates with a forwardly extending, axially disposed conduit 16. The forward end of the conduit 16 terminates short of the tip portion 13. As illustrated by the directional arrows, coolant under pressure enters through inlet conduit 15, flows forwardly in conduit 16, impinging upon the tip portion 13, reverses direction and flows rearwardly in annular space 17 and is expelled through a rearwardly disposed outlet conduit 18. The coolant may also flow in the reverse direction.

The entire probe, with the exception of an axially disposed area 19 on the tip portion thereof, is electrically insulated with a suitable material 20. The uninsulated area 19 is the only conducting portion of the probe which is exposed to the gas stream whose properties are to be probed. The uninsulated area 19 is made as small as a thousandth of an inch in diameter.

As illustrated in FIGURE 1, the probe 10 is intended to be placed in a plasma stream whose properties are to be probed. The probe is positioned so that the tip portion 13 faces the stream and the uninsulated, conducting area 19 is located at the precise point of the stream where gas is to be probed. The probe will be prevented from melting or burning due to the coolant being circulated continuously within the probe and the insulation layer.

The electrical measuring circuit 11, as shown, is conventional in nature, suitable for obtaining current and voltage readings. The circuit includes a battery 21 used to impose a voltage on the probe 10 by means of a lead wire 22 electrically connected to inlet and outlet conduits 15 and 18, a rheostat 23 for varying the voltage imposed on the probe, an ammeter 24 for measuring the current, and a voltmeter 25 for measuring the voltage.

In the use of the device illustrated in FIGURE 1, the coolant first is begun circulating in the probe and permitted to flow during the entire period of operation. The coolant may be water circulated through the probe under a pressure of about 500 p.s.i. When the coolant has reached a sufficient flow rate, the probe 10 is inserted into the plasma stream and the exposed electrically conducting tip portion 19 is positioned at the precise location in the stream where its properties are to be probed.

The procedure then is to impose a voltage on the probe by means of the battery and rheostat, and observe the current and voltage on the ammeter and voltmeter, respectively. After a series of such readings at different voltage settings, the data are plotted as shown in FIGURE 4. As in classical probe theory, the measured (unsaturated) electron current is related to the measured voltage imposed on the probe by, $$\log_e \frac{I_e}{A} = \log_e \left[ \epsilon(n_e)_w \sqrt{\frac{kT_e}{2\pi m_e}} \right] + \frac{\epsilon V}{kT_e}$$

where $I_e$=electron current (measured)
$A$=uninsulated probe area (known)
$\epsilon$=electron charge (known)
$(n_e)_w$=electron density at the probe surface (unknown)
$k$=Boltzmann constant (known)
$T_e$=electron temperature (unknown)
$m_e$=electron mass (known)
$V$=applied voltage (measured)

To determine the electron temperature $T_e$, we differentiate the current with respect to the voltage:

$$\frac{d\left(\log_e \frac{I_e}{A}\right)}{dV} = \frac{\epsilon}{kT_e}$$

and thus, if the logarithm of the measured current is plotted against the measured voltage, the resulting plot should be a straight line whose slope may be measured and used to calculate the electron temperature $T_e$, which has shown previously to be unchanged in passing through the probe boundary layer.

Once the temperature is known, the undifferentiated equation for $\log_e I_e$ may then be used to calculate the probe-surface electron density $(n_e)_w$, which is equal to the free-stream electron density $n_e$, or else a simpler method utilizing the measured saturation current (see FIGURE 4) can be used, since for the ordering of dimensions shown in FIGURE 3, the saturation current is almost identical with the random electron current striking the probe. This random current is written $$(j_R)_o = \frac{1}{4}(n_e)_w \overline{C}_e e$$

$\overline{C}_e$ = mean electron kinetic velocity (proportional to the square root of the electron temperature $T_e$) =

$$\sqrt{\frac{kT_e}{m_e}}$$

$e$ = electric charge per electron
$k$ = Boltzmann's constant $j_R$ = current density $\left(\frac{I_e}{A}\right)$ of random electrons Thus, since $T_e$ is known, $(n_e)_w$ may be calculated from the measured saturation current.

The simple circuit of FIGURE 1 may be modified in many different ways. For example, an oscilloscope horizontal sweep circuit can be used to apply the voltage, covering the entire abscissa of FIGURE 4, 60 times or more each second. The current is then simultaneously observed as the ordinate on the face of the oscilloscope. Thus, the entire current-voltage trace of FIGURE 4 can be produced 60 times or more each second, and photographs of the (calibrated) oscilloscope screen provide the necessary data at each location of the probe tip in the plasma.

FIGURE 2 of the drawings illustrates another embodiment of the invention. This embodiment is substantially similar to the embodiment illustrated in FIGURE 1, but is modified to some extent to permit it to be used in measuring various properties of the gas stream other than electron temperature and density. Similar to the device shown in FIGURE 1, the embodiment of FIGURE 2 includes a cooled electrostatic probe 26 and an electrical measuring circuit 27. The probe 26 consists of a tubular member 28, including a main body section 29 and an angularly offset, forwardly disposed section 30. The tubular member is provided with a closed curved tip portion 31 and a closed rear end wall 32. The tubular member 28 is of extremely small size. The typical diameter of the member 28 may vary in the range of 0.100 inch to 0.250 inch.

Mounted within the tubular member 28 is a concentrically disposed tubular member 33 having a main body section 34 disposed concentric with the main body section 29 of tubular member 28, and a forwardly disposed section 35 disposed concentric with the forwardly disposed section 30 of tubular member 29. The rearward end of the section 34 extends rearwardly of the end wall 32 of member 28 and is closed by an end wall 36. The forward end of the member 33 is open and disposed adjacent to the tip portion 31 of the tubular member 28.

The probe is provided with an axial passageway therethrough by means of a tubular member 37, having a main body section 38 disposed concentric with main body sections 29 and 34, and a forwardly disposed section 39 which is disposed concentric with the forwardly disposed sections 35 and 30. The forward end of the member 37 is secured to the tip portion 31, and the rear end thereof is supported in the end wall 36 of tubular member 33. The main body section 38 extends outwardly of the end wall 36 and forms a gas conducting tube 40.

Coolant under pressure is introduced into the interior of the probe by means of an inlet conduit 41 secured to the rearward end of tubular member 28, which communicates with the annular space 42 provided in the probe between the tubular sections 29 and 34. As illustrated by the directional arrows, coolant under pressure enters through inlet conduit 41, flows forwardly in the annular space 42 toward the tip portion 31, reverses direction and flows rearwardly in annular space 43 disposed between sections 34 and 38, wherefrom it is expelled through a rearwardly disposed outlet conduit 44.

The entire probe, including the inlet and outlet conduits 41 and 44 and the gas conducting conduit 40, with the exception of an axially disposed annular area 45 on the tip portion 31 thereof, is electrically insulated with a suitable material 46. The uninsulated area 45 is the only conducting portion of the probe which is exposed to the direct gas stream whose properties are to be probed. The electrical measuring circuit 27 is identical to the circuit 11, illustrated in connection with the embodiment illustrated in FIGURE 1.

The probe illustrated in FIGURE 2 is intended to be placed in a plasma stream whose properties are to be probed. The probe is positioned so that the tip portion 31 faces the stream and the uninsulated, electrically conducting area 45 is located at the precise point of the stream where the gas is to be probed. Similar to the first mentioned embodiment, the probe is prevented from melting or burning, due to the coolant being circulated continuously within the probe, and the insulation layer.

In the operation of the device illustrated in FIGURE 2, coolant first is begun circulating in the probe and permitted to flow during the entire period of operation. The coolant may be water circulated through the probe under pressure of about 500 p.s.i. When the coolant has reached a sufficient flow rate, the probe 26 is inserted into the plasma stream and the exposed electrically conducting tip portion 45 is positioned at the precise location in the stream where the properties of the gas are to be probed.

When the probe is in position, a voltage is impressed on the probe by means of the battery and rheostat, and the current and voltage are observed on the ammeter and voltmeter, respectively. After a series of such readings at different voltage settings, the data are plotted as shown in FIGURE 4. The electron temperature and density can be mathematically computed as described in connection with the embodiment illustrated in FIGURE 1.

Additional properties of the plasma can be measured with the use of the device illustrated in FIGURE 2, by incorporating additional measuring devices, as described in U.S. Patent No. 3,167,956. The inlet and outlet conduits 41 and 44 can be provided with suitable valves to regulate the flow of the coolant in the probe, and a flow meter can be provided in the circuit of the coolant to measure the flow thereof. A thermocouple 47 is mounted in the inlet conduit 41 to measure the initial temperature of the coolant and a thermocouple 48 is mounted in the outlet conduit 44 to measure the exit temperature of the coolant.

The axially disposed tubular member 37 permits a gas sample to be extracted from the stream and conducted through the conduit 40 to various devices, as described in U.S. Patent No. 3,167,956, for measuring the mass flow of the gas, its pressure, and its chemical composition. A thermocouple 49 also is mounted in the rear end of the member 37 to permit measurement of the exit temperature of the gas sample. It will be appreciated that the device illustrated in FIGURE 2 combined with the measuring devices illustrated and described in U.S. Patent No. 3,167,956 can be employed with the use of mathematical computation for determining electron temperature and density, floating potential, saturation current ratio in dense plasmas, enthalpy, degree of nonequilibrium in a reduced pressure plasma, a semi-quantitative measurement of plasma turbulence, heavy particle temperature, velocity and chemical composition of a partly or fully ionized gas.

Because of the unusually high electron current densities for which the cooled electrostatic probes of FIGURES 1 and 2 may be used, the properties of the insulator are not nearly so critical as in the conventional Langmuir probe, which measures only tiny current densities and, therefore, requires extremely high resistivity of the conductor coating. The cooled probe can be insulated with a coating of a standard commercial refractory cement such as Sauereisen.

In addition to the types of probes mentioned above, other types of cooled probes, suitably insulated in the manner described, can be utilized within the scope of this invention. Such probes include cooled pneumatic probes, heat transfer probes, dilution probes, cooled sonic-orifice probes, cooled double-sonic-orifice probes, calorimetric probes of any type, or any other type of cooled probe which may be inserted into a hot gas or plasma for any purpose.

What I claim is:

1. A probe for diagnosing properties of a partly or fully ionized gas comprising electrically conductive means connectable to means for impressing a voltage thereon, and insertable in the ionized gaseous environment, means for cooling said electrically conductive means and means for electrically insulating said electrically conductive means from said ionized gaseous environment with the exception of a selected area thereof.

2. A probe for diagnosing properties of a partly or fully ionized gas according to claim 1, wherein the size of the uninsulated selected area is relatively small in comparison to the size of the probe.

3. A probe for diagnosing properties of a partly or fully ionized gas according to claim 1, wherein said electrically conductive means comprises an elongated member having said selected uninsulated area disposed at an end thereof for positioning in said ionized gas environment.

4. A probe for diagnosing properties of a partly or fully ionized gas according to claim 3, wherein said electrically insulating means comprises a coating of electrically insulating material disposed on said elongated member.

5. A probe for diagnosing properties of a partly or fully ionized gas according to claim 3, wherein said cooling means includes a passageway in said elongated member for circulating a coolant.

6. A probe for diagnosing properties of a partly or fully ionized gas according to claim 1, including a passageway extending therethrough for extracting a sample of said gas, having its inlet located adjacent said selected uninsulated area.

7. A probe for diagnosing properties of a partly or fully ionized gas according to claim 6, wherein the size of the uninsulated selected area is relatively small in comparison to the size of the probe.

8. A probe for diagnosing properties of a partly or fully ionized gas according to claim 6, wherein said electrically conductive means comprises an elongated member having said selected uninsulated area disposed at an end thereof for positioning in said ionized gas environment.

9. A probe for diagnosing properties of a partly or fully ionized gas according to claim 8, wherein said electrically insulating means comprises a coating of electrically insulating material disposed on said elongated member.

10. A probe for diagnosing properties of a partly or fully ionized gas according to claim 8, wherein said cooling means includes a passageway in said elongated member for circulating a coolant.

11. A device for determining properties of a partly or fully ionized gas comprising a probe including an electrically conductive means insertable in the ionized gaseous environment, means for cooling said electrically conductive means, means for electrically insulating said electrically conductive means from said ionized gaseous environment with the exception of a selected area thereof, and means for imposing a voltage on said probe including means for measuring the current and voltage applied.

12. A device for determining properties of a partly or fully ionized gas according to claim 11, wherein the size of the uninsulated selected area is relatively small in comparison to the size of the probe.

13. A device for determining properties of a partly or fully ionized gas according to claim 11, wherein said electrically conductive means comprises an elongated member having said selected uninsulated area disposed at an end thereof for positioning in said ionized gas environment.

14. A device for determining properties of a partly or fully ionized gas according to claim 13, wherein said electrically insulating means comprises a coating of electrically insulating material disposed on said elongated member.

15. A device for determining properties of a partly or fully ionized gas according to claim 13, wherein said cooling means includes a passageway in said elongated member for circulating a coolant.

16. A device for determining properties of a partly or fully ionized gas according to claim 11, including a passageway extending through said probe for extracting a sample of said gas, having its inlet located adjacent said selected uninsulated area.

17. A device for determining properties of a partly or fully ionized gas according to claim 16, wherein the size of the uninsulated selected area is relatively small in comparison to the size of the probe.

18. A device for determining properties of a partly or fully ionized gas according to claim 16, wherein said electrically conductive means comprises an elongated member having said selected uninsulated area disposed at an end thereof for positioning in said ionized gas environment.

19. A device for determining properties of a partly or fully ionized gas according to claim 18, wherein said electrically insulating means comprises a coating of electrically insulating material disposed on said elongated member.

20. A device for determining properties of a partly or fully ionized gas according to claim 18, wherein said cooling means includes a passageway in said elongated member for circulating a coolant.

21. A method of determining properties of a partly or fully ionized gas comprising inserting an electrically conductive means in the gaseous environment, insulating said electrically conductive means from said gaseous environment with the exception of a selected exposed area, positioning said selected exposed area at the desired location in said gaseous environment where the properties thereof are to be diagnosed, cooling the electrically conductive means, imposing a selected voltage on said electrically conductive means, measuring the current and voltage applied to said electrically conductive means and recording the measured data from which the desired properties may be computed.

22. The method according to claim 21, including the steps of extracting a sample of gas from the region of said gaseous environment adjacent said exposed uninsulated area of said probe, measuring selected properties of said sample and recording the measured data derived from said sample from which additional desired properties may be computed.

References Cited

UNITED STATES PATENTS

| | | | |
|---|---|---|---|
| 2,782,103 | 2/1957 | Prentiss | 73—26 XR |
| 2,820,945 | 1/1958 | Marsden | 324—33 |
| 3,167,956 | 2/1965 | Grey | 73—190 |
| 3,138,025 | 6/1964 | Fingerson | 73—190 XR |
| 3,301,059 | 1/1967 | Haas | 73—190 |

CHARLES A. RUEHL, Primary Examiner

U.S. Cl. X.R.

73—339; 324—33